(12) United States Patent
Roach

(10) Patent No.: US 8,220,252 B2
(45) Date of Patent: Jul. 17, 2012

(54) EXHAUST GAS EMISSIONS REACTOR AND METHOD OF TREATING EXHAUST GAS

(75) Inventor: Michael Roach, Santa Fe, NM (US)

(73) Assignee: Caterpillar CleanAIR Systems Inc., Santa Fe, NM (US)

( * ) Notice: Subject to any disclaimer, the term of this patent is extended or adjusted under 35 U.S.C. 154(b) by 477 days.

(21) Appl. No.: 12/436,058

(22) Filed: May 5, 2009

(65) Prior Publication Data

US 2010/0281851 A1 Nov. 11, 2010

(51) Int. Cl.
*F01N 3/00* (2006.01)

(52) U.S. Cl. ............... 60/286; 60/274; 60/287; 60/295; 60/301; 60/324

(58) Field of Classification Search .................. 60/274, 60/286, 287, 288, 295, 297, 299, 301, 303, 60/324
See application file for complete search history.

(56) References Cited

U.S. PATENT DOCUMENTS

| 5,601,792 | A  | * | 2/1997 | Hug et al. | 422/169 |
| 6,401,449 | B1 | * | 6/2002 | Hofmann et al. | 60/286 |
| 6,442,933 | B2 | * | 9/2002 | Rusch | 60/286 |
| 6,444,177 | B1 | * | 9/2002 | Muller et al. | 422/177 |
| 6,449,947 | B1 | * | 9/2002 | Liu et al. | 60/286 |
| 6,680,037 | B1 | * | 1/2004 | Allansson et al. | 423/215.5 |
| 6,877,313 | B1 | * | 4/2005 | Phillips et al. | 60/297 |
| 7,337,607 | B2 | * | 3/2008 | Hou et al. | 60/274 |

* cited by examiner

*Primary Examiner* — Binh Q Tran
(74) *Attorney, Agent, or Firm* — Finnegan, Henderson, Farabow, Garrett & Dunner LLP

(57) ABSTRACT

An exhaust gas emissions reactor and method of treating exhaust gas. The reactor has a housing for receiving exhaust gas from an engine. An oxidation catalyst is disposed in the housing for receiving exhaust gas from an inlet, and at least one mixing duct in the housing receives exhaust gas from the oxidation catalyst. An injector introduces reduction agent into the exhaust gas in the mixing duct, and at least one mixer effects mixing of exhaust gas and reduction agent. Disposed in the mixing duct downstream of the injector is an SCR catalyst for receiving exhaust gas/reduction agent mixture therethrough. Treated exhaust gas is conveyed to an outlet of the housing.

20 Claims, 3 Drawing Sheets

_US 8,220,252 B2_

EXHAUST GAS EMISSIONS REACTOR AND METHOD OF TREATING EXHAUST GAS

BACKGROUND OF THE INVENTION

The present invention relates to an exhaust gas emissions reactor and to a method of treating exhaust gas.

Systems are known for reducing noise and exhaust gas emissions for engines used as a stationary power source for such applications as electrical power generation, oil drilling, gas compression, water pumping, and the like. Such a system is also usable in marine and railroad applications.

A typical known system of this type includes an exhaust gas conduit leading from an engine, with reduction agent, such as urea, being injected into the exhaust gas conduit. A mixer may also be disposed in the conduit downstream of which the exhaust gas/reduction agent mixture is conveyed first through a Selective Catalytic Reduction (SCR) means, for example three layers of SCR catalyst, and subsequently through, for example, one layer of oxidation catalyst. The treated exhaust gas is then conveyed to an exhaust discharge.

It is an object of the present invention to provide an improved reactor and system for reducing exhaust emissions and noise.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The exhaust gas emissions reactor of the present application comprises a housing having an inlet for receiving exhaust gas from an engine, and an outlet for discharging treated exhaust gas; oxidation catalyst means are disposed in the housing for receiving exhaust gas from the inlet; at least one mixing duct is disposed in the housing for receiving exhaust gas from the oxidation catalyst means; injector means are provided for introducing reduction agent into the exhaust gas in the mixing duct; at least one mixer is disposed in the mixing duct for effecting mixing of exhaust gas and reduction agent; and SCR catalyst means are provided for receiving exhaust gas/reduction agent mixture therethrough, wherein the SCR catalyst means is disposed in the mixing duct downstream of the injector means and upstream of the outlet of the housing.

The method of the present application for treating exhaust gas includes the steps of conveying exhaust gas from an engine to a reactor; passing exhaust gas from the engine through oxidation catalyst means provided in the reactor; conveying exhaust gas from the oxidation catalyst means to at least one mixing duct; introducing reduction agent into the exhaust gas in the mixing duct; mixing the exhaust gas and reduction agent in the mixing duct and passing the mixture through an SCR catalyst means; and discharging treated exhaust gas from the SCR catalyst means out of the reactor.

A primary advantage of the reactor and method of the present application is that the reactor housing not only provides a silencer for the engine exhaust gas, but also houses the SCR catalyst means.

Furthermore, the reactor of the present application can significantly reduce the overall size of the exhaust gas emissions system.

Further specific embodiments of the present application will be described in detail subsequently.

DESCRIPTION OF SPECIFIC EMBODIMENTS

Figure 1:
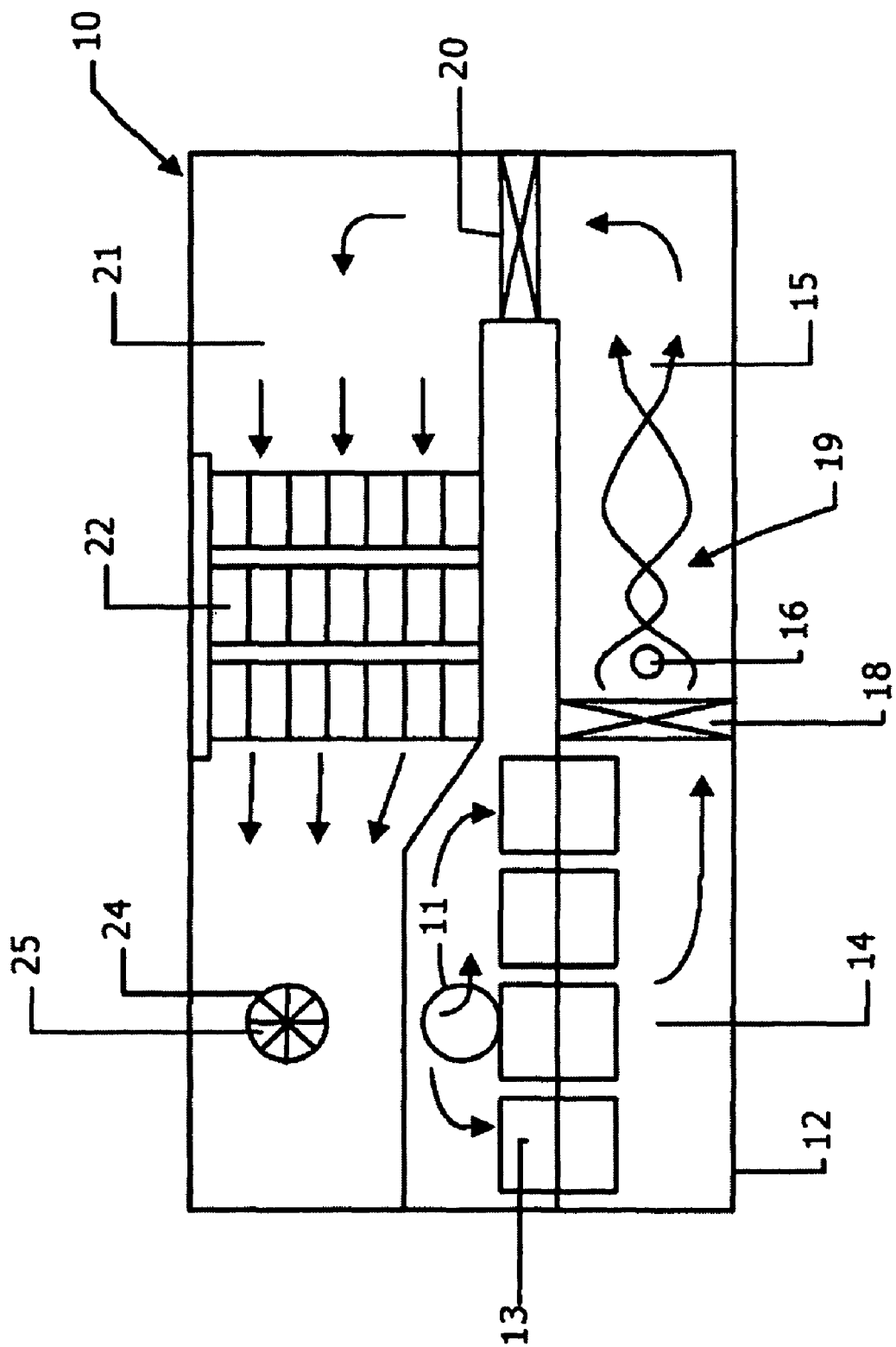
FIG. 1 is a plan view onto a first exemplary embodiment of an exhaust gas emissions reactor.
Figure 2:
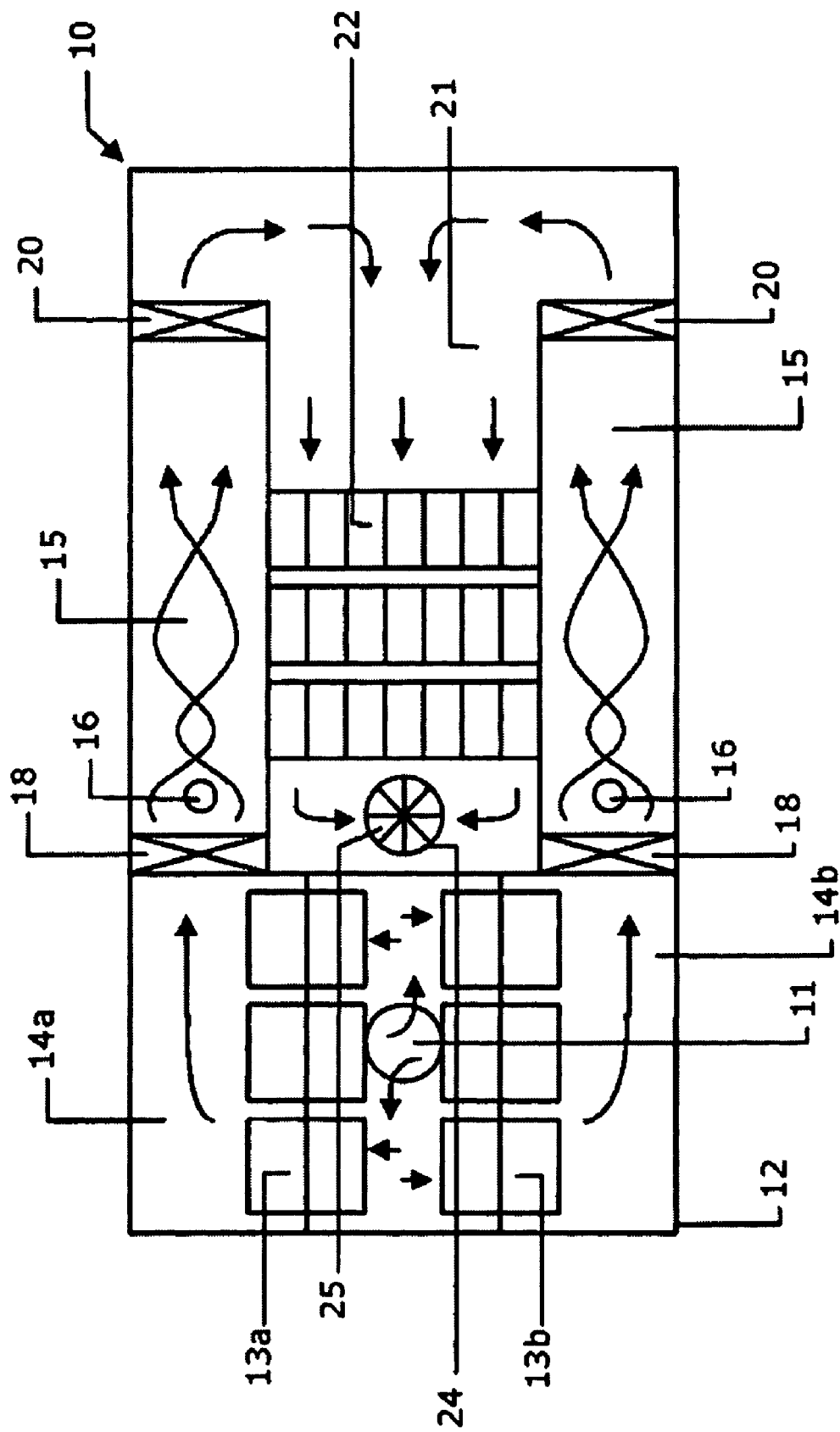
FIG. 2 is a plan view of a second exemplary embodiment of an exhaust gas emissions reactor.
Figure 3:
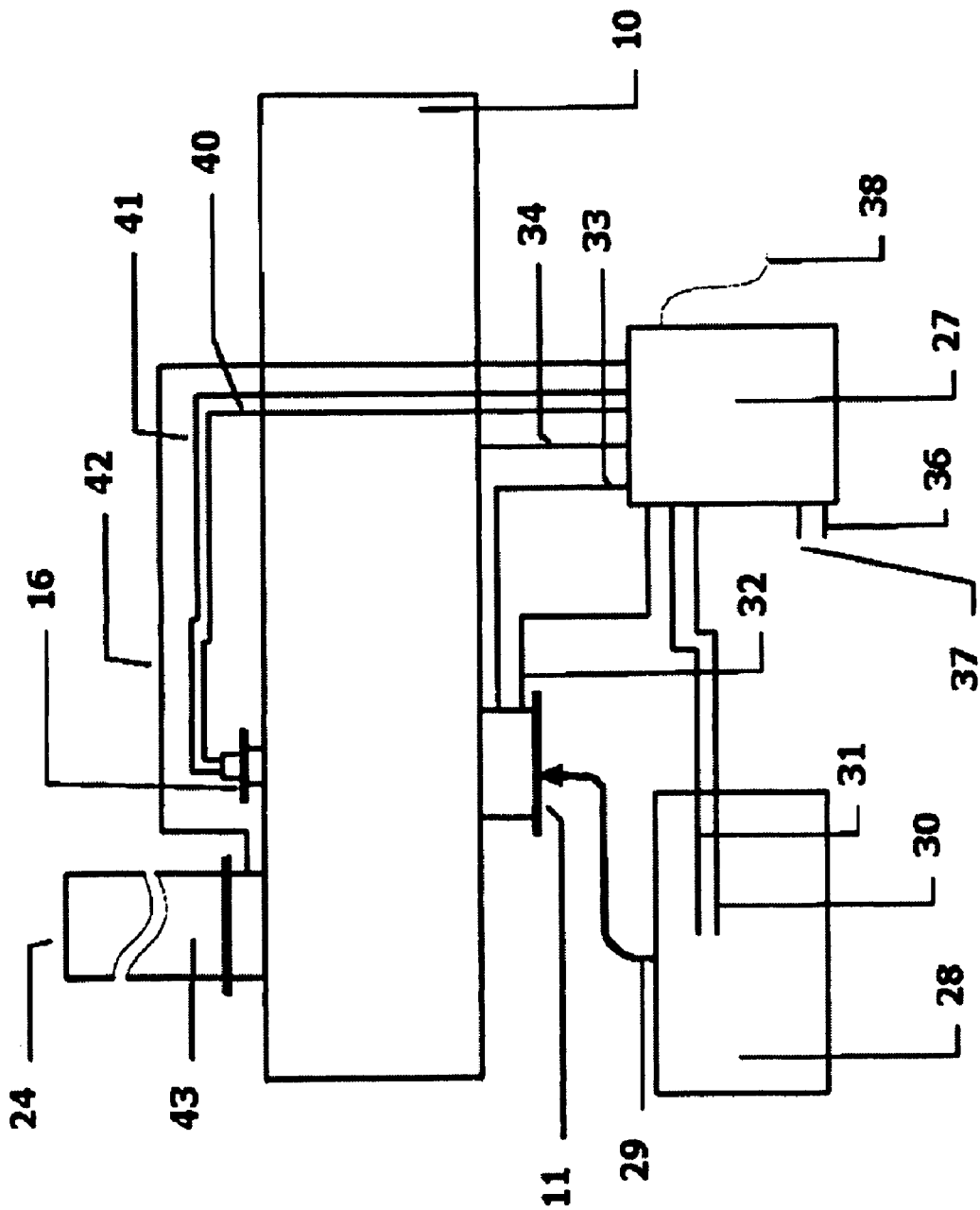
FIG. 3 shows an exemplary embodiment of an exhaust gas emissions system, including controls and sensors for a reactor of the present invention.

Referring now to the drawings in detail, several exemplary embodiments of applicant's exhaust gas emissions system are shown in FIGS. 1-3. FIGS. 1 and 2 are detailed schematic illustrations of the reactor itself, which is designated generally by the reference numeral 10. FIG. 3 schematically illustrates various controls, sensors, etc. for the reactor 10.

In the single-duct embodiment of the exhaust gas emissions reactor 10 illustrated in FIG. 1, exhaust gas from an engine (for example from the engine shown in FIG. 3), enters the reactor 10 at the exhaust gas inlet 11. The arrows indicate the flow of exhaust gas through the housing 12 of the reactor. After entering the reactor 10, i.e. the housing 12 thereof, the exhaust gas passes through the oxidation catalyst means 13, which will be discussed in greater detail subsequently. The exhaust gas exiting the oxidation catalyst means 13 then enters the mixing duct 14.

Disposed in the first section 15 of the mixing duct 14 is an injector means 16 for introducing reduction agent into the flow of exhaust gas in the first mixing duct section 15. Disposed upstream of the injector means 16 in the first mixing duct section 15 is a mixer 18, such as a static mixer, in order to cause turbulent exhaust gas flow, resulting in a high degree of mixing of the reduction agent introduced by the injector means 16 with the exhaust gas, as indicated by the reference arrow 19 downstream of the injector means 16.

If desired, to maintain turbulent flow and a high degree of mixing, at least one additional mixer 20, again for example a static mixer, can be disposed downstream of the injector means 16 in the first mixing duct section 15. Following the mixer 20, the exhaust gas/reduction agent mixture enters the second mixing duct section 21 of the mixing duct 14, and then flows through the SCR catalyst means 22, which is disposed in the second mixing duct section 21.

The treated exhaust gas exiting the SCR catalyst means 22 then passes to the outlet 24 of the housing 12 of the reactor 10. A further mixer 25, again for example in the form of a static mixer, can be disposed at the outlet 24 for a purpose to be discussed in detail subsequently.

Whereas the embodiment illustrated in FIG. 1 is a single-duct exhaust gas emissions reactor, the embodiment illustrated in FIG. 2 is a dual-duct reactor. Comparable features are identified by the same reference numerals used in conjunction with the embodiment of FIG. 1.

After the exhaust gas enters the housing 12 of the reactor 10 at the inlet 11, part of the exhaust gas flows through a first oxidation catalyst means portion 13a and the rest of the exhaust gas passes through a second oxidation catalyst means portion 13b. The exhaust gas exiting the first and second portions 13a, 13b of the oxidation catalyst means then enters a mixing duct 14a and 14b respectively in the housing 12 of the reactor 10. Disposed in the first mixing duct section 15 of each mixing duct 14a, 14b are again an injector means 16 for introducing reduction agent into the exhaust gas, and upstream of the injector means 16 a mixer 18. At least one additional mixer 20 can be disposed at the end of each of the first mixing duct sections 15.

The exhaust gas/reduction agent mixture from each of the first mixing duct sections 15 then passes into a common second mixing duct section 21 of the mixing ducts 14a, 14b. As with the embodiment of the exhaust gas emissions reactor 10 of FIG. 1, the exhaust gas/reduction agent mixture then flows through the SCR catalyst means 22 disposed in the common second mixing duct section 21. The treated exhaust gas exiting the SCR catalyst means 22 then passes through the outlet 24 of the housing 12. A further mixer 25 can again be disposed at the outlet 24.

The embodiment of the exhaust gas emissions system illustrated in FIG. 3 shows various controls and sensors for the proper operation of the reactor 10. In particular, the cabinet 27 includes, among others, a computer controller, a dosing pump, an air pressure regulator, and otherwise all controls necessary for the precise delivery of the correct amount of reduction agent to the reactor 10 under existing engine and reactor conditions.

The engine 28, which can be a diesel, including bio-diesel, natural gas or any other lean burn internal combustion engine or turbine, delivers exhaust gas to the inlet 11 of the housing 12 of the reactor 10 via the exhaust gas duct 29, with the inlet 11 in this embodiment being shown on the underside of the reactor. The controller in the cabinet 27 monitors various parameters of the engine 28 and of the reactor 10. For example, via the line 30 and an Is appropriate boost pressure sensor, the controller measures engine intake manifold pressure after a turbocharger. Via the line 31 and an appropriate boost pressure temperature sensor, the controller also measures engine intake manifold temperature after the turbocharger. By means of the line 32 and an exhaust pressure sensor, engine exhaust pressure, also known as exhaust back pressure, is measured upstream of the reactor 10 prior to entry of the exhaust gas into the inlet 11. Via the line 33 and a pre $NO_x$ sensor, the $NO_x$ concentration in the exhaust gas is also measured upstream of the reactor 10. Via the line 34 and a temperature sensor, the exhaust gas temperature within the reactor 10 is measured.

For its function as a dosing cabinet, a compressed air or inert gas inlet line 36, and a reduction agent inlet line 37, enter the cabinet 27. The reduction agent is typically urea, but could also, by way of example only, be aqueous ammonia, anhydrous ammonia, or some other form of liquid or gaseous ammonia. In addition, the reduction agent can also be hydrocarbon based, such as diesel fuel, gasoline or natural gas. Line 38 indicates a power supply input to the cabinet 27. In a manner precisely controlled by the computer controller based on sensor inputs and feedback, and via the reduction agent supply line 40, the proper amount of reduction agent is supplied in a correctly timed manner to the injector means 16, which can, for example, be in the form of a spray lance. By means of the compressed air or inert gas line 41, compressed air or inert gas is also supplied to the injector means or spray lance 16 to assist in the atomization of the reduction agent. In particular, the spray lance 16 combines the reduction agent with the compressed air or inert gas to produce a highly atomized spray, which is then introduced for mixture into the exhaust gas upstream of the SCR catalyst means 22, as indicated by the arrow 19 in FIG. 1. As an alternative to the spray lance 16, an electronic controlled pulse width modulated injector may also be used.

By means of the line 42 and an appropriate post $NO_x$ sensor, the $NO_x$ concentration in the treated exhaust gas as it leaves the reactor 10 is measured. In particular, the post $NO_x$ sensor is disposed in the exhaust or flue gas stack 43 downstream of the mixer 25 (FIGS. 1 and 2), which ensures a mixing upstream of the post $NO_x$ sensor to eliminate exhaust stratification and hence to improve the accuracy of the sensor.

To avoid toxic and hazardous vanadium-based catalyst, the SCR catalyst means 22 used in the reactor 10 is, by way of example only, iron-zeolite coated on ceramic. Copper-zeolite or any other type of SCR catalyst used to reduce $NO_x$ in exhaust gases may also be used. The oxidation catalyst means 13, which is disposed upstream of the SCR catalyst means 22, can be an oxidation converter or a particulate filter. The oxidation converter can be comprised of a substrate having multiple parallel channels coated with an oxidation catalyst, such as platinum, for example for decreasing concentrations of carbon monoxide and hydrocarbons within the exhaust gas, and/or for increasing the $NO_2$ concentration within the exhaust gas.

The particulate filter, which also removes particulate matter from the exhaust gas stream, can have an oxidation catalyst applied to the filter, for example for decreasing concentrations of carbon monoxide and hydrocarbons within the exhaust gas, and/or for increasing the $NO_2$ concentration within the exhaust gas. For example, the particulate filter can be a ceramic filter coated with platinum. A non-illustrated active regeneration system for the particulate filter can also be incorporated within the housing 12 of the reactor 10. The regeneration system operates by increasing the temperature within the exhaust gas, or by injecting hydrocarbons such as diesel fuel into the exhaust gas, all for the purpose of burning collected particulate matter within the filter, thus regenerating the filter.

Although the injector means 16 is shown as being slightly downstream of the static mixer 18, the injector means 16 can also be disposed in a plane of the mixer 18. In such a case, the reduction agent could be sprayed or otherwise injected into the mixer from the middle and/or from the edges of the mixer.

Although not illustrated, to maximize the efficiency of the oxidation catalyst means 13 and/or the SCR catalyst means 22, a heating means can be provided in the mixing duct 14 or 14a, 14b in order to increase or maintain the exhaust gas temperature in the mixing duct. Such heating means can also be used to regenerate the diesel particulate filter means 13. The heating means can be activated as necessary by the control computer in the cabinet 27 in response to temperatures measured by appropriate sensors, such as the sensors 32 and 34.

Although reactor sizes will vary depending upon a specific application, pursuant to one exemplary embodiment the reactor 10 can have a length of 12 feet, a width of 8 feet, and a height of 5 feet.

The width and height of the mixing ducts can have a ratio ranging from 1:1 to 3:1 to facilitate adequate mixing. In addition, the length of the mixing ducts should be sufficient to allow between ⅛ to 7 seconds of time measured from the introduction of the reduction agent to contact of the exhaust gas/reduction agent mixture with the inlet face of the SCR catalyst means 22 at maximum exhaust gas flow. A presently preferred time is ½ seconds.

Where the static mixer 18 is disposed upstream of the reduction agent injector means 16, the distance between the mixer 18 and the injector means 16 should be sufficient for creating turbulent flow, and hence a high degree of mixing of the reduction agent with the exhaust gas. For example, the static mixer 18 should be disposed no more than four mixer diameters upstream of the injector means 16 and up to ½ inch upstream of the injector means. A presently preferred location of the static mixer 18 is 6 to 12 inches upstream of the injector means 16.

Where an exhaust or flue gas stack is provided (FIG. 3), the height thereof should be equal to 2 to 8 stack diameters.

The present invention is, of course, in no way restricted to the specific disclosure of the specification and drawings, but also encompasses any modifications within the scope of the appended claims.

What I claim is:

1. An exhaust gas emissions reactor, comprising:
    a housing having an inlet for receiving exhaust gas from an engine, and an outlet for discharging treated exhaust gas;
    an oxidation catalyst disposed in said housing for receiving exhaust gas from said inlet;
    at least one mixing duct disposed in said housing for receiving exhaust gas from said oxidation catalyst;
    an injector for introducing reduction agent into the exhaust gas in said at least one mixing duct;
    at least one static mixer disposed in said at least one mixing duct for effecting mixing of exhaust gas and reduction agent; and
    an SCR catalyst downstream of said oxidation catalyst for receiving exhaust gas/reduction agent mixture therethrough, wherein said SCR catalyst is disposed in said at least one mixing duct downstream of said injector and upstream of said outlet of said housing.

2. A reactor according to claim 1, wherein said at least one mixing duct comprises a single mixing duct.

3. An exhaust gas emissions reactor, comprising:
    a housing having an inlet for receiving exhaust gas from an engine, and an outlet for discharging treated exhaust gas;
    at least one oxidation catalyst disposed in said housing for receiving exhaust gas from said inlet;
    a first mixing duct for receiving exhaust gas from said oxidation catalyst;
    a second mixing duct for receiving exhaust gas from said oxidation catalyst;
    a first injector for introducing reduction agent into the exhaust gas in said first mixing duct;
    a second injector for introducing reduction agent into the exhaust gas in said second mixing duct;
    first mixer disposed in said first mixing duct for effecting mixing of exhaust gas and reduction agent;
    a second mixer disposed in said second mixing duct for effecting mixing of exhaust gas and reduction agent; and
    an SCR catalyst downstream of said oxidation catalyst for receiving exhaust gas/reduction agent mixture therethrough, said SCR catalyst being disposed in a third mixing duct section downstream of said first and second injectors and upstream of said outlet of said housing,
    said first and second mixing ducts leading to said third mixing duct section disposed downstream thereof.

4. A reactor according to claim 1, wherein a first static mixer is disposed upstream of said injector.

5. A reactor according to claim 1, which includes a first static mixer, wherein said injector is disposed in a plane of said first static mixer.

6. A reactor according to claim 1, which includes a first static mixer disposed upstream or in the immediate vicinity of said injector and a second static mixer disposed downstream of said injector.

7. A reactor according to claim 1, which includes a first static mixer disposed upstream or in the immediate vicinity of said injector, and a second static mixer disposed downstream of said SCR catalyst and just upstream of said outlet of said housing.

8. A reactor according to claim 7, which includes a pre $NO_x$ sensor disposed at said inlet of said housing, and a post $NO_x$ sensor disposed at said outlet of said housing.

9. A reactor according to claim 8, which includes temperature sensors disposed at said inlet of said housing and within said reactor.

10. A reactor according to claim 9, which includes a controller configured to introduce reduction agent into the exhaust gas as a function of signals received from said $NO_x$ sensors and temperature sensors.

11. A reactor according to claim 1, wherein said oxidation catalyst is a particulate filter having an oxidation catalyst coating.

12. A reactor according to claim 11, wherein said particulate filter is a platinum coated ceramic filter.

13. A reactor according to claim 1, wherein said oxidation catalyst is an oxidation converter that includes an oxidation catalyst.

14. A reactor according to claim 1, wherein said SCR catalyst is iron zeolite coated ceramic.

15. A reactor according to claim 1, wherein said injector is a spray lance.

16. A reactor according to claim 1, wherein a exhaust or flue gas stack is disposed at said outlet of said housing for the discharge of treated exhaust gas.

17. A method of treating exhaust gas, including the steps of:
    providing a reactor;
    conveying exhaust gas from an engine to said reactor;
    disposing an oxidation catalyst in said reactor;
    passing exhaust gas from said engine through said oxidation catalyst;
    conveying exhaust gas from said oxidation catalyst to at least one mixing duct;
    introducing reduction agent into said exhaust gas in said at least one mixing duct;
    mixing exhaust gas and reduction agent in said at least one mixing duct;
    passing exhaust gas/reduction agent mixture through an SCR catalyst downstream of said oxidation catalyst; and
    discharging treated exhaust gas from said SCR catalyst out of said reactor.

18. A method according to claim 17, wherein said step of conveying exhaust gas to at least one mixing duct comprises conveying exhaust gas to a single mixing duct.

19. A method according to claim 17, wherein said step of conveying exhaust gas to at least one mixing duct comprises conveying exhaust gas from said oxidation catalyst to two separate mixing ducts.

20. A reactor according to claim 3, said first mixer and said second mixer being static mixers.

* * * * *